United States Patent
Kalluri et al.

(10) Patent No.: US 7,299,343 B2
(45) Date of Patent: Nov. 20, 2007

(54) SYSTEM AND METHOD FOR COOPERATIVE EXECUTION OF MULTIPLE BRANCHING INSTRUCTIONS IN A PROCESSOR

(75) Inventors: Seshagiri P. Kalluri, Richardson, TX (US); Ramon C. Trombetta, Garland, TX (US); Adam C. Krolnik, Allen, TX (US)

(73) Assignee: VeriSilicon Holdings (Cayman Islands) Co. Ltd., Santa Clara, CA (US)

( * ) Notice: Subject to any disclaimer, the term of this patent is extended or adjusted under 35 U.S.C. 154(b) by 434 days.

(21) Appl. No.: 10/256,864

(22) Filed: Sep. 27, 2002

(65) Prior Publication Data

US 2004/0064683 A1    Apr. 1, 2004

(51) Int. Cl.
    *G06F 9/44* (2006.01)
(52) U.S. Cl. .................................................... 712/226
(58) Field of Classification Search ................ 712/234, 712/235, 236, 237, 226
    See application file for complete search history.

(56) References Cited

U.S. PATENT DOCUMENTS

| | | | | |
|---|---|---|---|---|
| 4,969,091 A | * | 11/1990 | Muller ........................ | 712/228 |
| 5,193,157 A | * | 3/1993 | Barbour et al. ............. | 712/234 |
| 5,768,500 A | | 6/1998 | Agrawal et al. ........ | 395/184.01 |
| 5,951,696 A | | 9/1999 | Naaseh et al. ................ | 714/34 |
| 5,974,240 A | * | 10/1999 | Chan .......................... | 712/218 |
| 6,016,543 A | | 1/2000 | Suzuki et al. ................ | 712/233 |
| 6,047,369 A | * | 4/2000 | Colwell et al. ............. | 712/217 |
| 6,065,115 A | * | 5/2000 | Sharangpani et al. ....... | 712/235 |
| 6,108,766 A | * | 8/2000 | Hahn et al. .................... | 712/34 |
| 6,374,346 B1 | | 4/2002 | Seshan et al. ............... | 712/221 |
| 6,574,728 B1 | * | 6/2003 | Chayut ........................ | 712/234 |
| 6,662,294 B1 | * | 12/2003 | Kahle et al. ................ | 712/226 |
| 6,760,831 B2 | * | 7/2004 | Drabenstott et al. .......... | 712/22 |
| 2002/0199090 A1 | * | 12/2002 | Wilson ........................ | 712/234 |

FOREIGN PATENT DOCUMENTS

EP    0 130 381 A2 *    1/1985

OTHER PUBLICATIONS

"The PowerPC Architecture: A specification for a new family of RISC processors." IBM, 2nd ed., May 1994, pp. 19-22, 32-40, 57, 384-388.—Author(s)—n/a.

* cited by examiner

*Primary Examiner*—Eddie Chan
*Assistant Examiner*—Jacob Petranek

(57) ABSTRACT

A system for conditionally executing an instruction depending on a previously existing condition. The system disclosed is configured to handle conditional execution instructions typically specifying at least one target instruction, a processor register, and a condition within the register. The system saves a result of each of the target instructions dependent upon the existence of the condition in the specified register during execution of the conditional execution instruction. When the conditional execution instruction specifies a first flag register, the system copies the flag bits in the first flag register to a corresponding second flag register, and saves a result of each of the target instructions dependent upon the specified condition in the first flag register during execution of the conditional execution instruction. A subsequent conditional execution instruction may then specify a condition in the second flag register in order to conditionally execute target instructions based on a previously existing condition.

25 Claims, 10 Drawing Sheets

SYSTEM AND METHOD FOR COOPERATIVE EXECUTION OF MULTIPLE BRANCHING INSTRUCTIONS IN A PROCESSOR

FIELD OF THE INVENTION

This invention relates generally to data processing, and, more particularly, to apparatus and methods for conditionally executing software program instructions.

BACKGROUND OF THE INVENTION

Many modern processors employ a technique called pipelining to execute more software program instructions (instructions) per unit of time. In general, processor execution of an instruction involves fetching the instruction (e.g., from a memory system), decoding the instruction, obtaining needed operands, using the operands to perform an operation specified by the instruction, and saving a result. In a pipelined processor, the various steps of instruction execution are performed by independent units called pipeline stages. In the pipeline stages, corresponding steps of instruction execution are performed on different instructions independently, and intermediate results are passed to successive stages. By permitting the processor to overlap the executions of multiple instructions, pipelining allows the processor to execute more instructions per unit of time.

In practice, instructions are often interdependent, and these dependencies often result in "pipeline hazards." Pipeline hazards result in stalls that prevent instructions from continually entering a pipeline at a maximum possible rate. The resulting delays in pipeline flow are commonly called "bubbles." The detection and avoidance of hazards presents a formidable challenge to designers of pipeline processors, and hardware solutions can be considerably complex.

There are three general types of pipeline hazards: structural hazards, data hazards, and control hazards. A structural hazard occurs when instructions in a pipeline require the same hardware resource at the same time (e.g., access to a memory unit or a register file, use of a bus, etc.). In this situation, execution of one of the instructions must be delayed while the other instruction uses the resource.

A "data dependency" is said to exist between two instructions when one of the instructions requires a value or data produced by the other. A data hazard occurs in a pipeline when a first instruction in the pipeline requires a value produced by a second instruction in the pipeline, and the value is not yet available. In this situation, the pipeline is typically stalled until the operation specified by the second instruction is completed and the needed value is produced.

In general, a "scalar" processor issues instructions for execution one at a time, and a "superscalar" processor is capable of issuing multiple instructions for execution at the same time. A pipelined scalar processor concurrently executes multiple instructions in different pipeline stages; the executions of the multiple instructions are overlapped as described above. A pipelined superscalar processor, on the other hand, concurrently executes multiple instructions in different pipeline stages, and is also capable of concurrently executing multiple instructions in the same pipeline stage. Pipeline hazards typically have greater negative impacts on performances of pipelined superscalar processors than on performances of pipelined scalar processors. Examples of pipelined superscalar processors include the popular Intel® Pentium® processors (Intel Corporation, Santa Clara, Calif.) and IBM® PowerPC® processors (IBM Corporation, White Plains, N.Y.).

A "control dependency" is said to exist between a non-branch/jump instruction and one or more preceding branch/jump instructions that determine whether the non-branch/jump instruction is executed. Conditional branch/jump instructions are commonly used in software programs (i.e., code) to effectuate changes in control flow. A change in control flow is necessary to execute one or more instructions dependent on a condition. Typical conditional branch/jump instructions include "branch if equal," "jump if not equal," "branch if greater than," etc. A control hazard occurs in a pipeline when a next instruction to be executed is unknown, typically as a result of a conditional branch/jump instruction. When a conditional branch/jump instruction occurs, the correct one of multiple possible execution paths cannot be known with certainty until the condition is evaluated. Any incorrect prediction typically results in the need to purge partially processed instructions along an incorrect path from a pipeline, and refill the pipeline with instructions along the correct path.

A software technique called "predication" provides an alternate method for conditionally executing instructions. Predication may be advantageously used to eliminate branch instructions from code, effectively converting control dependencies to data dependencies. If the resulting data dependencies are less constraining than the control dependencies that would otherwise exist, instruction execution performance of a pipelined processor may be substantially improved.

In predicated execution, the results of one or more instructions are qualified dependent upon a value of a preceding predicate. The predicate typically has a value of "true" (e.g., binary '1') or "false" (e.g., binary '0'). If the qualifying predicate is true, the results of the one or more subsequent instructions are saved (i.e., used to update a state of the processor). On the other hand, if the qualifying predicate is false, the results of the one or more instructions are not saved (i.e., are discarded).

In some known processors, values of qualifying predicates are stored in dedicated predicate registers. In some of these processors, different predicate registers may be assigned (e.g., by a compiler) to instructions along each of multiple possible execution paths. Predicated execution may involve executing instructions along all possible execution paths of a conditional branch/jump instruction, and saving the results of only those instructions along the correct execution path. For example, assume a conditional branch/jump instruction has two possible execution paths. A first predicate register may be assigned to instructions along one of the two possible execution paths, and a second predicate register may be assigned to instructions along the second execution path. The processor attempts to execute instructions along both paths in parallel. When the processor determines the values of the predicate registers, results of instructions along the correct execution path are saved, and the results of instructions along the incorrect execution path are discarded.

The above method of predicated execution involves associating instructions with predicate registers (i.e., "tagging" instructions along the possible execution paths with an associated predicate register). This tagging is typically performed by a compiler, and requires space (e.g., fields) in instruction formats to specify associated predicate registers.

This presents a problem in reduced instruction set computer (RISC) processors typified by fixed-length and densely-packed instruction formats.

Another example of conditional execution involves the TMS320C6x processor family (Texas Instruments Inc., Dallas, Tex.). In the 'C6x' processor family, all instructions are conditional. Multiple bits of a field in each instruction are allocated for specifying a condition. If no condition is specified, the instruction is executed. If an instruction specifies a condition, and the condition is true, the instruction is executed. On the other hand, if the specified condition is false, the instruction is not executed. This form of conditional execution also presents a problem in RISC processors in that multiple bits are allocated in fixed-length and densely-packed instruction formats.

In a sequence of instructions (i.e., code) including a "previous" instruction and one or more "subsequent" instructions separated by one or more intervening instructions, it is often desirable to execute the subsequent instructions based on a state or condition of the processor resulting from execution of the previous instruction. Existence of the state or condition is typically indicated by certain values of one or more bits in one or more registers of the processor (e.g., a flag bit of a flag register, a status bit in a status register, etc.) following execution of the previous instruction.

Current approaches to obtaining the above described conditional execution capability typically involve saving the contents of a register, including one or more bits with values indicative of the condition, following execution of the previous instruction. The contents of the register are typically saved either in a general purpose register of the processor, or in a memory system coupled to the processor. Following execution of the intervening instructions, the saved contents of the register are accessed or retrieved and tested (e.g., via one or more compare instructions) to determine if a particular state or condition existed in the processor during execution of the previous instruction. The subsequent instructions are then selectively executed (e.g., via conditional branch instructions) dependent upon whether the particular state or condition existed in the processor during execution of the previous instruction.

A problem arises in that the above-described current approaches typically incur a performance penalty that may be considered substantial in some applications. For example, processors typically include a relatively small number of general purpose registers, and each general purpose register represents a considerable performance advantage over storing data in, and later retrieving data from, a memory system coupled to the processor. When a general purpose register is used to store the contents of a flag or status register in order to obtain the above described conditional execution capability, that general purpose register is not available for use by the intervening instructions. As a result, a value that might otherwise be stored in a general purpose register during executions of the intervening instructions may have to be stored in the memory system, and later retrieved from the memory system, incurring a substantial performance penalty. On the other hand, storing the contents of the flag or status register in the memory system following the previous instruction, and retrieving the contents from the memory system prior to executions of the subsequent instructions, expectedly incurs the same substantial performance penalty.

SUMMARY OF THE INVENTION

A processor is disclosed including an instruction unit and an execution unit. The instruction unit is configured to fetch and decode a conditional execution instruction and at least one target instruction. The conditional execution instruction specifies the at least one target instruction, a register of the processor, and a condition within the register. The execution unit is coupled to the instruction unit and configured to save a result of each of the at least one target instruction dependent upon the existence of the specified condition in the specified register during execution of the conditional execution instruction.

In the event the conditional execution instruction specifies a first flag register, the execution unit copies a value of each of multiple flag bits in the first flag register to a corresponding flag bit in a second flag register, and saves a result of each of the at least one target instruction dependent upon the specified condition in the first flag register during execution of the conditional execution instruction. The values of the flag bits in the first flag register are thus saved in the second flag register for possible future use.

A system (e.g., a computer system) is described including a memory system and a processor coupled to the memory system. The memory system includes the conditional execution instruction described above and the at least one target instruction. The processor includes the first flag register, the second flag register, the instruction unit, and the execution unit described above.

A method is disclosed for conditionally executing at least one instruction. Operations of the method include inputting the conditional execution instruction described above and the at least one target instruction. The following operations are performed in the event the conditional execution instruction specifies a first flag register: (i) a value of each of multiple flag bits in the first flag register are copied to a corresponding flag bit in a second flag register, and (ii) a result of each of the at least one target instruction is saved dependent upon the specified condition in the first flag register during execution of the conditional execution instruction.

BRIEF DESCRIPTION OF THE DRAWINGS

The invention may be understood by reference to the following description taken in conjunction with the accompanying drawings, in which like reference numerals identify similar elements, and in which.

DETAILED DESCRIPTION OF THE PREFERRED EMBODIMENTS

In the following disclosure, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, some details, such as details concerning network communications, electromagnetic signaling techniques, and the like, have been omitted inasmuch as such details are not considered necessary to obtain a complete understanding of the present invention, and are considered to be within the understanding of persons of ordinary skill in the relevant art. It is further noted that all functions described herein may be performed in either hardware or software, or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections.

Figure 1:
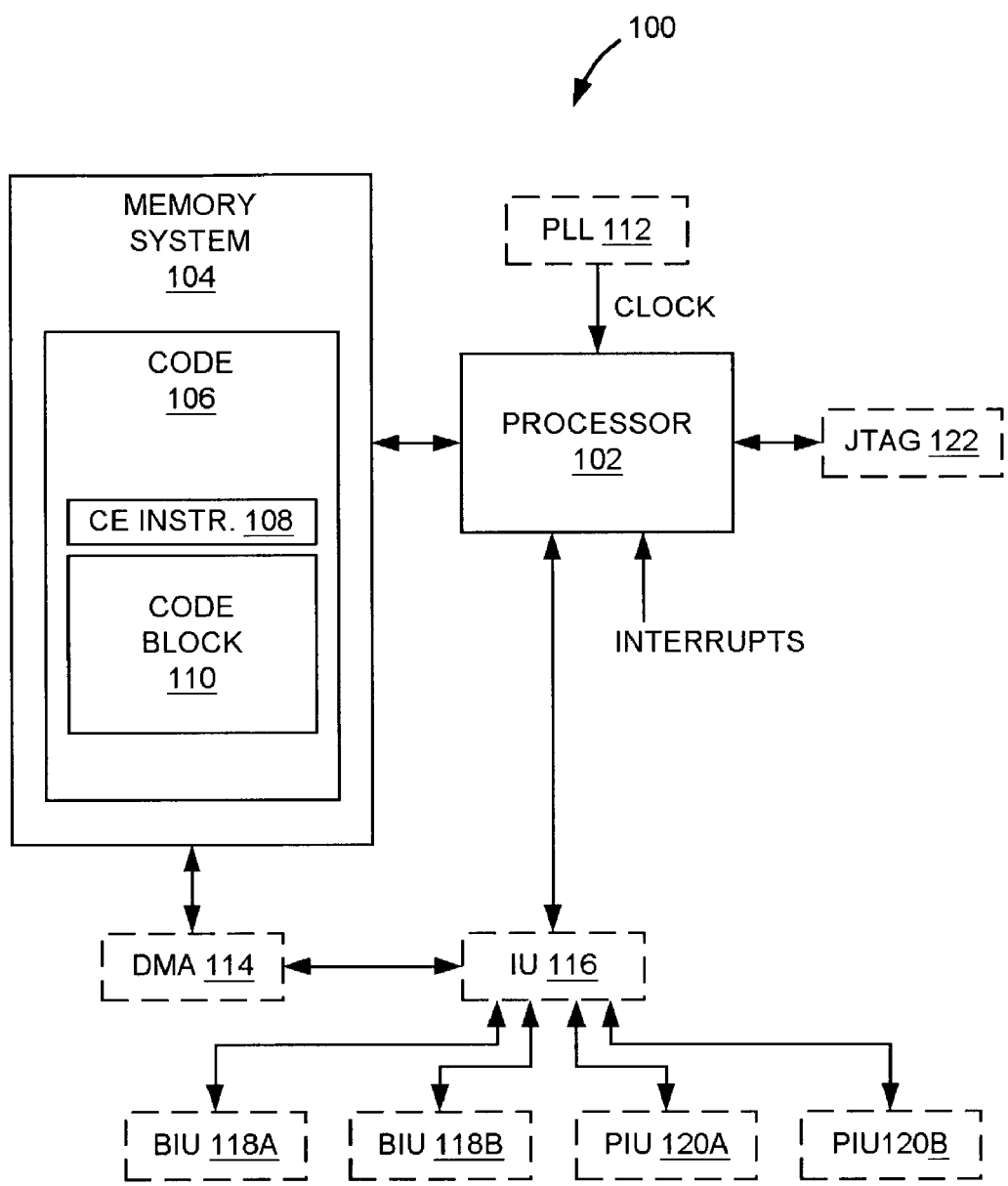
FIG. 1 is a diagram of one embodiment of a data processing system including a processor coupled to a memory system, wherein the memory system includes software program instructions (i.e., "code"), and wherein the code includes a conditional execution instruction and a code block including one or more instructions to be conditionally executed.

FIG. 1 is a diagram of one embodiment of a data processing system 100 including a processor 102 coupled to a memory system 104. The processor 102 executes instructions of a predefined instruction set. As illustrated in FIG. 1, the memory system 104 includes a software program (i.e., code) 106 including instructions from the instruction set. In general, the processor 102 fetches and executes instructions stored in the memory system 104. In the embodiment of FIG. 1, the code 106 includes a conditional execution instruction 108 of the instruction set, and a code block 110 specified by the conditional execution instruction 108. In general, the code block 110 includes one or more instructions selected from the instruction set. The conditional execution instruction 108 also specifies a condition that determines whether execution results of the one or more instructions of the code block 110 are saved in the processor 102 and/or the memory system 104.

The memory system 104 may include, for example, volatile memory structures (e.g., dynamic random access memory structures, static random access memory structures, etc.) and/or non-volatile memory structures (read only memory structures, electrically erasable programmable read only memory structures, flash memory structures, etc.).

In the embodiment of FIG. 1, during execution of the code 106, the processor 102 fetches the conditional execution instruction 108 from the memory system 104 and executes the conditional execution instruction 108. As described in more detail below, the conditional execution instruction 108 specifies the code block 110 (e.g., a number of instructions making up the code block 110) and a condition. During execution of the conditional execution instruction 108, the processor 102 determines the code block 110 and the condition, and evaluates the condition to determine if the condition exists in the processor 102. The processor 102 also fetches the instructions of the code block 110 from the memory system 104, and executes each of the instructions of the code block 110, producing corresponding execution results within the processor 102. The execution results of the instructions of the code block 110 are saved in the processor 102 and/or the memory system 104 dependent upon the existence of the condition specified by the conditional execution instruction 108 in the processor 102. In other words, the condition specified by the conditional execution instruction 108 qualifies the writeback of the execution results of the instructions of the code block 110. The instructions of the code block 110 may otherwise traverse the pipeline normally. The results of the instructions of the code block 110 are used to change a state of the processor 102 and/or the memory system 104 only if the condition specified by the conditional execution instruction 108 exists in the processor 102.

In the embodiment of FIG. 1, the processor 102 implements a load-store architecture. That is, the instruction set includes load instructions used to transfer data from the memory system 104 to registers of the processor 102, and store instructions used to transfer data from the registers of the processor 102 to the memory system 104. Instructions other than the load and store instructions specify register operands, and register-to-register operations. In this manner, the register-to-register operations are decoupled from accesses to the memory system 104.

As indicated in FIG. 1, the processor 102 receives a CLOCK signal and executes instructions dependent upon the CLOCK signal. The data processing system 100 may include a phase-locked loop (PLL) circuit 112 that generates the CLOCK signal. The data processing system 100 may also include a direct memory access (DMA) circuit 114 for accessing the memory system 104 substantially independent of the processor 102. The data processing system 100 may also include bus interface units (BIUs) 118A and 118B for coupling to external buses, and/or peripheral interface units (PIUs) 120A and 120B for coupling to external peripheral devices. An interface unit (IU) 116 may form an interface between the bus interface units (BIUs) 118A and 118B and/or the peripheral interface units (PIUs) 120A and 120B, the processor 102, and the DMA circuit 114. The data processing system 100 may also include a JTAG (Joint Test Action Group) circuit 122 including an IEEE Standard 1149.1 compatible boundary scan access port for circuit-level testing of the processor 102. The processor 102 may also receive and respond to external interrupt signals (i.e., interrupts) as indicted in FIG. 1.

Figure 2:
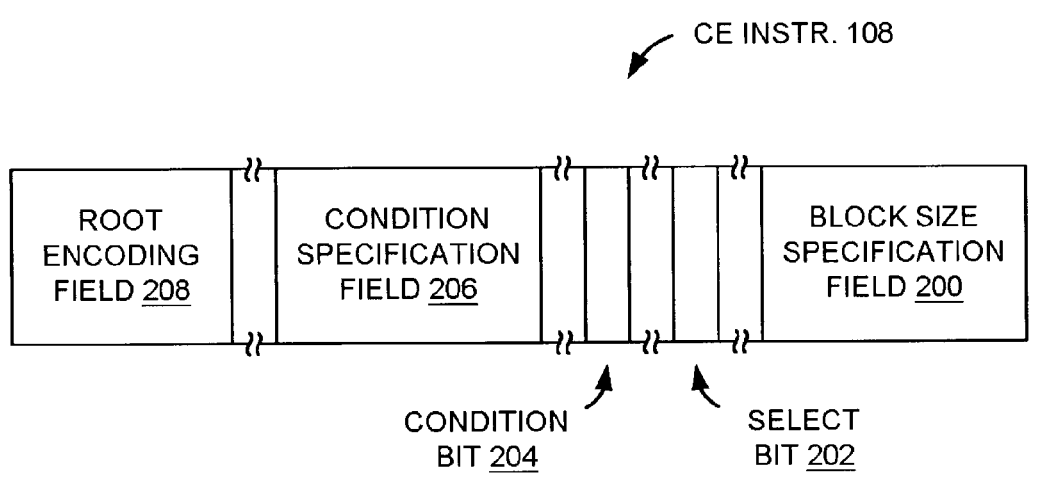
FIG. 2 is a diagram of one embodiment of the conditional execution instruction of FIG. 1.

FIG. 2 depicts one embodiment of the conditional execution instruction 108 of FIG. 1. In the embodiment of FIG. 2, the conditional execution instruction 108 and the one or more instructions of the code block 110 of FIG. 1 are fixed-length instructions (e.g., 16-bit instructions), and the instructions of the code block 110 immediately follow the conditional execution instruction 108 in the code 106 of FIG. 1. It is noted that other embodiments of the conditional execution instruction 108 of FIG. 1 are possible and contemplated.

In the embodiment of FIG. 2, the conditional execution instruction 108 includes a block size specification field 200, a select bit 202, a condition bit 204, a condition specification field 206, and a root encoding field 208. The block size specification field 200 is used to store a value indicating a number of instructions immediately following the conditional execution instruction 108 and making up the code block 110 of FIG. 1. The block size specification field 200 may be, for example, a 3-bit field specifying a code block including from 1 (block size specification field="000") to 8 (block size specification field="111") instructions immediately following the conditional execution instruction 108. Larger code blocks 110 could be specified by increasing the size or number of bits in the block size specification field 200.

As described in detail below, the processor 102 of FIG. 1 includes multiple flag registers and multiple general purpose registers. A value of the select bit 202 indicates whether the condition specified by the conditional execution instruction 108 of FIG. 1 is stored in a flag register or in a general purpose register. For example, if the select bit 202 is a '0,' the select bit 202 may indicate that the condition specified by the conditional execution instruction 108 of FIG. 1 is stored in a flag register. On the other hand, if the select bit 202 is a '1,' the select bit 202 may indicate that the condition specified by the conditional execution instruction 108 of FIG. 1 is stored in a general purpose register.

In general, the condition bit 204 specifies a value used to qualify the execution results of the instructions in the code block 110. For example, if the condition bit 204 is a '0,' the execution results of the instructions of the code block 110 of FIG. 1 may be qualified (i.e., stored) only if a value stored in a specified register of the processor 102 of FIG. 1 is equal to '0' during execution of the conditional execution instruction 108. On the other hand, if the condition bit 204 is a '1,' the execution results of the instructions of the code block 110 may be stored only if the value stored in the specified register is not equal to '0'.

For example, when the select bit 202 indicates that the condition specified by the conditional execution instruction 108 of FIG. 1 is stored in a flag register and the condition bit 204 is a '0,' the condition specified by the conditional execution instruction 108 may be that the value of a specified flag bit in a specified flag register is '0.' Similarly, when the select bit 202 indicates that the condition specified by the conditional execution instruction 108 of FIG. 1 is stored in a general purpose register and the condition bit 204 is a '0,' the condition specified by the conditional execution instruction 108 may be that the value stored in the specified general purpose register is '0.'

In a similar manner, when the select bit 202 indicates that the condition specified by the conditional execution instruction 108 of FIG. 1 is stored in a flag register and the condition bit 204 is a '1,' the condition specified by the conditional execution instruction 108 may be that the value of the specified flag bit in the specified flag register is '1.' Similarly, when the select bit 202 indicates that the condition specified by the conditional execution instruction 108 of FIG. 1 is stored in a general purpose register and the condition bit 204 is a '1,' the condition specified by the conditional execution instruction 108 may be that the value stored in the specified general purpose register is non-zero, or not equal to '0'.

In general, the condition specification field 206 specifies either a particular flag bit in a particular flag register, or a particular one of the multiple general purpose registers of the processor 102. For example, when the select bit 202 indicates that the condition specified by the conditional execution instruction 108 of FIG. 1 is stored in a flag register, the condition specification field 206 specifies a particular one of the multiple flag registers of the processor 102 of FIG. 1, and a particular one of several flag bits in the specified flag register. When the select bit 202 indicates that the condition specified by the conditional execution instruction 108 of FIG. 1 is stored in a general purpose register, the condition specification field 206 specifies a particular one of the multiple general purpose registers of the processor 102 of FIG. 1.

As described in more detail below, the embodiment of the processor 102 of FIG. 1 includes two flag registers: a hardware flag register 'HWFLAG' and a static hardware flag register 'SHWFLAG.' Both the HWFLAG and the SHWFLAG registers store the following flag bits:

v=32-Bit Overflow Flag. Cleared (i.e., '0') when a sign of a result of a twos-complement addition is the same as signs of 32-bit operands (where both operands have the same sign); set (i.e., '1') when the sign of the result differs from the signs of the 32-bit operands.

gv=Guard Register 40-Bit Overflow Flag. (Same as the 'v' flag bit described above, but for 40-bit operands.)

sv=Sticky Overflow Flag. (Same as the 'v' flag bit described above, but once set, can only be cleared through software by writing a '0' to the 'sv' bit.)

gsv=Guard Register Sticky Overflow Flag. (Same as the 'gv' flag bit described above, but once set, can only be cleared through software by writing a '0' to the 'gsv' bit.)

c=Carry Flag. Set when a carry occurs during a twos-complement addition for 16-bit operands; cleared when no carry occurs.

ge=Greater Than Or Equal To Flag. Set when a result is greater than or equal to zero; cleared when the result is not greater than or equal to zero.

gt=Greater Than Flag. Set when a result is greater than zero; cleared when the result is not greater than zero.

z=Equal to Zero Flag. Set when a result is equal to zero; cleared when the result is not equal to zero.

Table 1 below lists exemplary encoding of the condition specification field 206 vaild when the select bit 202 indiciates that the condition specified by the conditional execution instruction 108 of FIG. 1 is stored in a flag register:

TABLE 1

Exemplary Encodings of the Condition Specification Field 206 Valid When the Select Bit 202 Indicates the Condition Is Stored in a Flag Register.

| Cond. Spec. Field 206 Value | Specified Flag Register | Specified Flag Bit |
| --- | --- | --- |
| 0000 | HWFLAG | v |
| 0001 | HWFLAG | gv |

TABLE 1-continued

Exemplary Encodings of the Condition Specification Field 206
Valid When the Select Bit 202 Indicates the Condition
Is Stored in a Flag Register.

| Cond. Spec. Field 206 Value | Specified Flag Register | Specified Flag Bit |
| --- | --- | --- |
| 0010 | HWFLAG | sv |
| 0011 | HWFLAG | gsv |
| 0100 | HWFLAG | c |
| 0101 | HWFLAG | ge |
| 0110 | HWFLAG | gt |
| 0111 | HWFLAG | z |
| 1000 | SHWFLAG | v |
| 1001 | SHWFLAG | gv |
| 1010 | SHWFLAG | sv |
| 1011 | SHWFLAG | gsv |
| 1100 | SHWFLAG | c |
| 1101 | SHWFLAG | ge |
| 1110 | SHWFLAG | gt |
| 1111 | SHWFLAG | z |

For example, referring to Table 1 above, when the select bit 202 indicates that the condition specified by the conditional execution instruction 108 of FIG. 1 is stored in a flag register, a '0101' encoding of the condition specification field 206 of the conditional execution instruction 108 specifies the hardware flag register and the 'ge' flag bit of the hardware flag register. If the condition bit 204 indicates the specified value must be a '1,' and the 'ge' flag bit of the hardware flag register is '1' during execution of the conditional execution instruction 108, the execution results of the instructions of the code block 110 of FIG. 1 are saved. On the other hand, if the 'ge' 108, the execution results of the instructions of the code block 110 of FIG. 1 are not saved (i.e., the execution results are discarded).

As described in more detail below, the embodiment of the processor 102 of FIG. 1 also includes 16 general purpose registers (GPRs) numbered '0' through '15.' Table 2 below lists exemplary encodings of the condition specification field 206 valid when the select bit 202 indicates that the condition specified by the conditional execution instruction 108 of FIG. 1 is stored in a general purpose register:

TABLE 2

Exemplary Encodings of the Condition Specification Field 206
Valid When the Select Bit 202 Indicates the Condition
Is Stored in a General Purpose Register.

| Cond. Spec. Field 206 Value | Specified GPR |
| --- | --- |
| 0000 | GPR 0 |
| 0001 | GPR 1 |
| 0010 | GPR 2 |
| 0011 | GPR 3 |
| 0100 | GPR 4 |
| 0101 | GPR 5 |
| 0110 | GPR6 |
| 0111 | GPR7 |
| 1000 | GPR8 |
| 1001 | GPR9 |
| 1010 | GPR10 |
| 1011 | GPR11 |
| 1100 | GPR12 |
| 1101 | GPR13 |
| 1110 | GPR14 |
| 1111 | GPR15 |

For example, referring to Table 2 above, when the select bit 202 indicates that the condition specified by the conditional execution instruction 108 of FIG. 1 is stored in a general purpose register, a '1011' encoding of the condition specification field 206 of the conditional execution instruction 108 specifies the GPR 11 register of the processor 102 of FIG. 1. If the condition bit 204 is a '1,' and the GPR 11 register does not contain a '0' during execution of the conditional execution instruction 108, the execution results of the instructions of the code block 110 of FIG. 1 are saved. On the other hand, if the GPR 11 register contains a '0' during execution of the conditional execution instruction 108, the execution results of the instructions of the code block 110 of FIG. 1 are not saved (i.e., the execution results are discarded).

The root encoding field 208 identifies an operation code (opcode) of the conditional execution instruction 108 of FIG. 2. In other embodiments of the conditional execution instruction 108, the root encoding filed 208 may also help define the condition specified by the conditional execution instruction 108. For example, the root encoding field 208 may also specify a particular group of registers within the processor 102 of FIG. 1 and/or a particular register within the processor 102.

Figure 3:
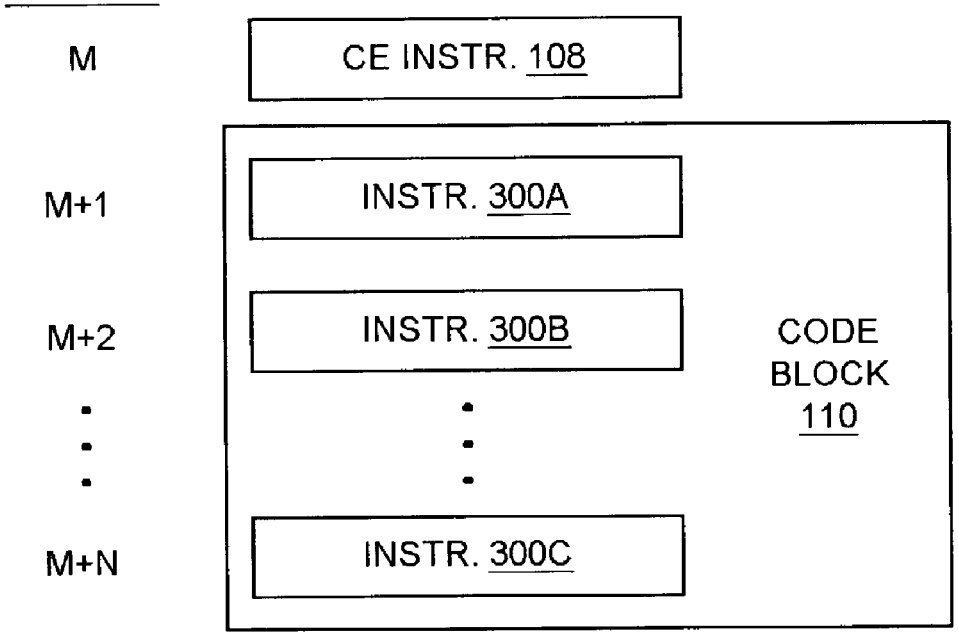
FIG. 3 is a diagram depicting an arrangement of the conditional execution instruction of FIG. 1 and instructions of the code block of FIG. 1 in the code of FIG. 1.

FIG. 3 is a diagram depicting an arrangement of the conditional execution instruction 108 of FIG. 1 and instructions of the code block 110 of FIG. 1 in the code 106 of FIG. 1. In the embodiment of FIG. 3, the code block 110 includes N instruction. The conditional execution instruction 108 is instruction number M in the code 106, and the N instructions of the code block 110 includes instructions 300A, 300B, and 300C. The instruction 300A immediately follows the conditional execution instruction 108 in the code 106, and is instruction number M+1 of the code 106. The instruction 300B immediately follows the instruction 300A in the code 106, and is instruction number M+2 of the code 106. The instruction 300C is instruction number M+N of the code 106, and is the nth (i.e., last) instruction of the code block 110. The value of N would be set in the block size specification filed 200 of the conditional execution instruction 108 as illustrated in FIG. 2.

Figure 4:
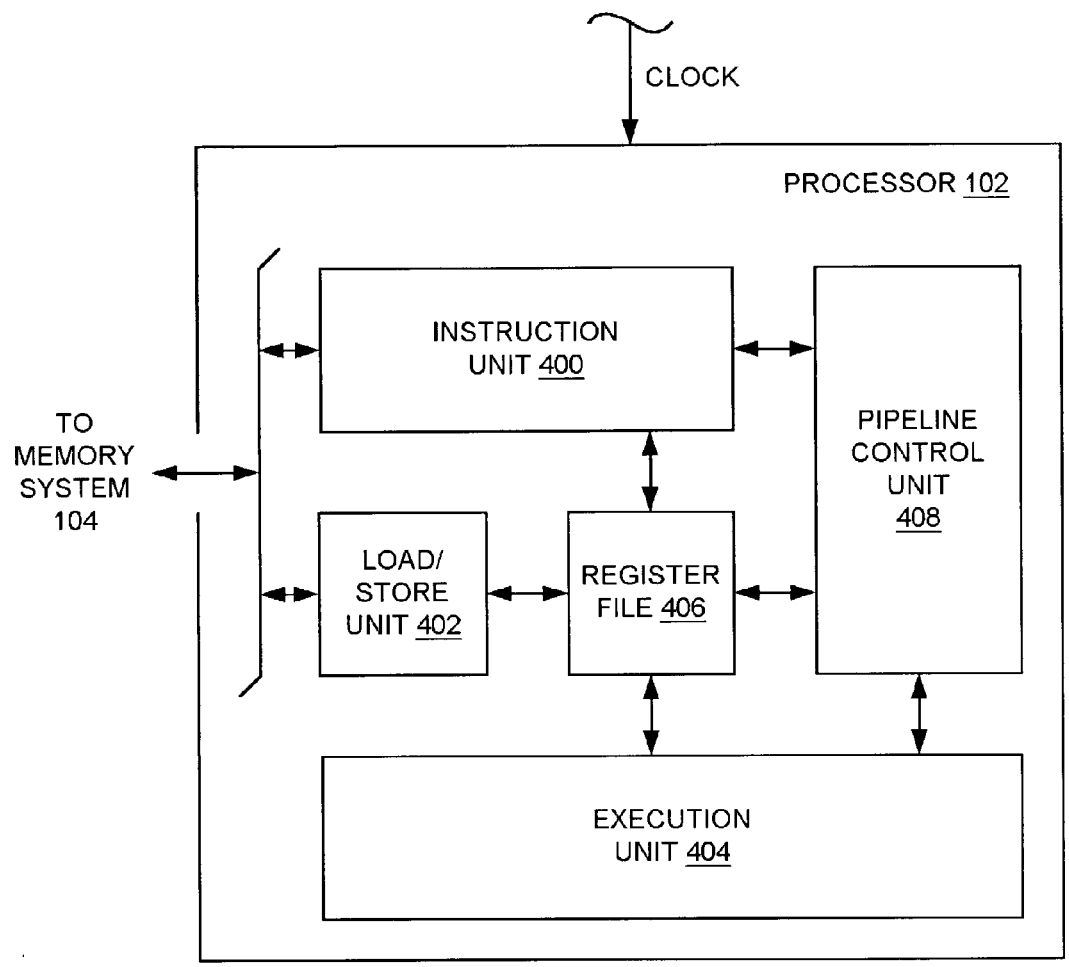
FIG. 4 is a diagram of one embodiment of the processor of FIG. 1, wherein the processor includes an instruction unit, a load/store unit, an execution unit, a register file, and a pipeline control unit.

FIG. 4 is a diagram of one embodiment of the processor 102 of FIG. 1. In the embodiment of FIG. 4, the processor 102 includes an instruction unit 400, a load/store unit 402, an execution unit 404, a register file 406, and a pipeline control unit 408 coupled to one another as shown in FIG. 4. In the embodiment of FIG. 4, the processor 102 is a pipelined superscalar processor. That is, the processor 102 implements an instruction execution pipeline including multiple pipeline stages, concurrently executes multiple instructions in different pipeline stages, and is also capable of concurrently executing multiple instructions in the same pipeline stage.

In general, the instruction unit 400 fetches instructions from the memory system 104 of FIG. 1 and decodes the instructions, thereby producing decoded instructions. The load/store unit 402 is used to transfer data between the processor 102 and the memory system 104 as described above. The execution unit 404 is used to perform operations specified by instructions (and corresponding decoded instructions). The register file 406 includes multiple registers of the processor 102, and is described in more detail below. The pipeline control unit 408 implements the instruction execution pipeline described in more detail below.

FIG. 5 is a diagram of one embodiment of the register file 406 of FIG. 4, wherein the register file 406 includes sixteen 16-bit general purpose registers 500 numbered 0 through 15, the hardware flag register described above and labeled 502 in FIG. 5, and the static hardware flag register described above and labeled 504 in FIG. 5.

Figure 5:
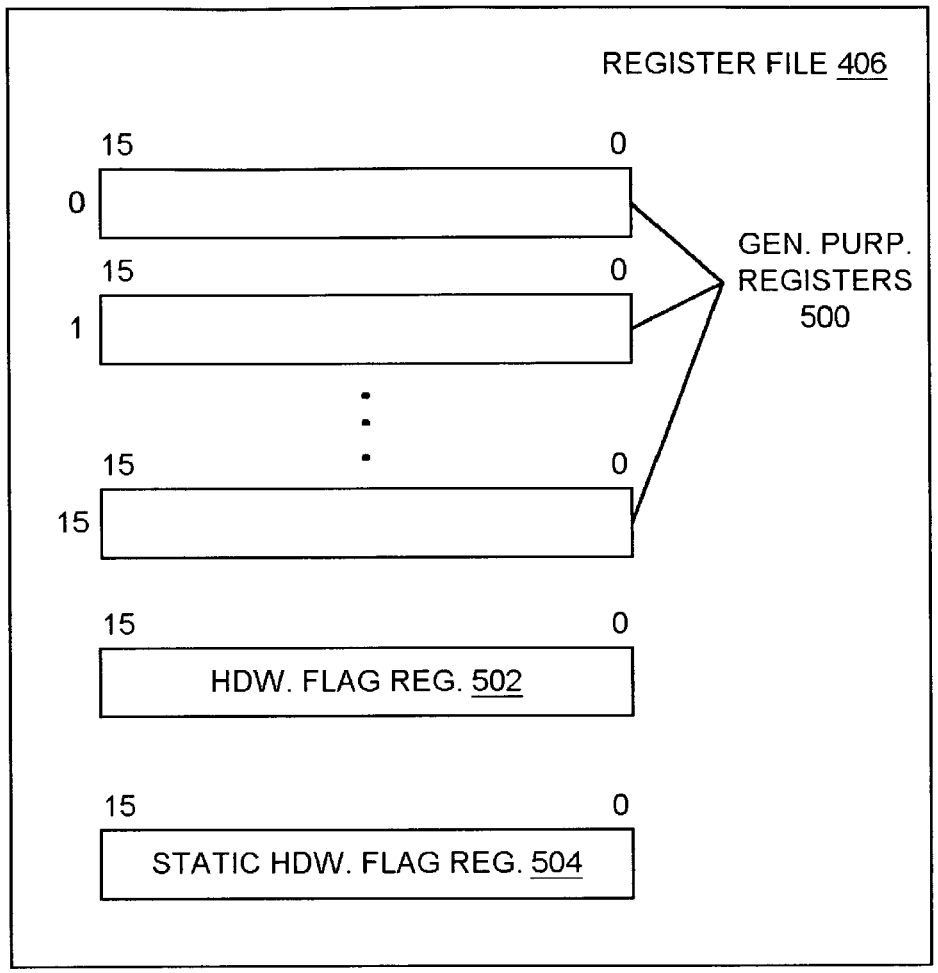
FIG. 5 is a diagram of one embodiment of the register file of FIG. 4, wherein the register file includes multiple general purpose registers, a hardware flag register, and a static hardware flag register.
Figure 6A:
FIG. 6A is a diagram of one embodiment of the hardware flag register of FIG. 5.

FIG. 6A is a diagram of one embodiment of the hardware flag register 502 of FIG. 5. In the embodiment of FIG. 6A, the hardware flag register 502 includes the flag bits 'v', 'gv', 'sv', 'gsv', 'c', 'ge', 'gt', and 'z' described above. The hardware flag register 502 is updated during instruction execution such that the flag bits in the hardware flag register 502 reflect a state or condition of the processor 102 of FIGS. 1 and 4 resulting from instruction execution.

Figure 6B:
FIG. 6B is a diagram of one embodiment of the static hardware flag register of FIG. 5.

FIG. 6B is a diagram of one embodiment of the static hardware flag register 504 of FIG. 5. In the embodiment of FIG. 6B, the static hardware flag register 504 also includes the flag bits 'v', 'gv', 'sv', 'gsv', 'c', 'ge', 'gt', and 'z' described above. Unlike the hardware flag register 502 of FIGS. 5 and 6A, and as will be described in detail below, the static hardware flag register 504 is updated only when a conditional execution instruction in the code 106 of FIG. 1 (e.g., the conditional execution instruction 108 of FIGS. 1 and 3) specifies the hardware flag register 502.

As defined hereinbelow, a "hardware flag register" is a flag register that is updated during instruction execution such that flag bits in the flag register reflect a state or condition of a processor resulting from instruction execution. A "static hardware flag register" is a flag register that is updated from a hardware flag register, and used to store persistent values of the flag bits of the hardware flag register.

Figure 7:
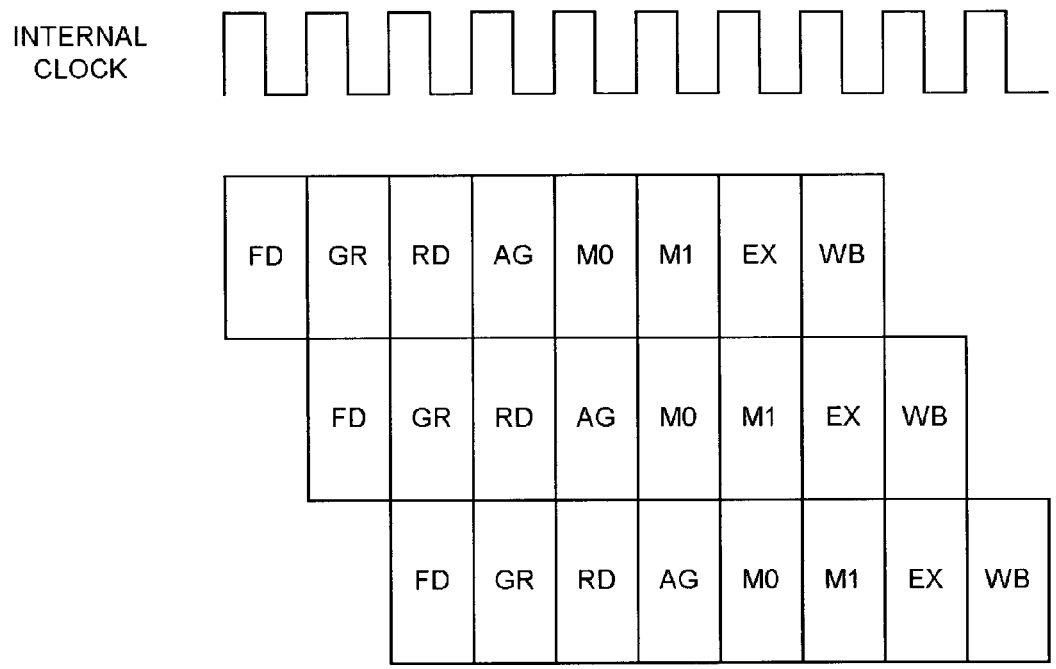
FIG. 7 is a diagram illustrating an instruction execution pipeline implemented within the processor of FIG. 4 by the pipeline control unit of FIG. 4.

FIG. 7 is a diagram illustrating the instruction execution pipeline implemented within the processor 102 of FIG. 4 by the pipeline control unit 408 of FIG. 4. The instruction execution pipeline (pipeline) allows overlapped execution of multiple instructions. In the example of FIG. 7, the pipeline includes 8 stages: a fetch/decode (FD) stage, a grouping (GR) stage, an operand read (RD) stage, an address generation (AG) stage, a memory access 0 (M0) stage, a memory access 1 (M1) stage, an execution (EX) stage, and a write back (WB) stage.

The processor 102 of FIG. 4 uses the CLOCK signal to generate an internal clock signal. As indicated in FIG. 7, operations in each of the 8 pipeline stages are completed during a single cycle of the internal clock signal.

Referring to FIGS. 4 and 7, the instruction unit 400 of FIG. 4 fetches several instructions (e.g., 6 instructions) from the memory system 104 of FIG. 1 during the fetch/decode (FD) pipeline stage of FIG. 7, decodes the instructions, and provides the decoded instructions to the pipeline control unit 408.

During the grouping (GR) stage, the pipeline control unit 408 checks the multiple decoded instructions for grouping and dependency rules, and passes one or more of the decoded instructions conforming to the grouping and dependency rules on to the read operand (RD) stage as a group. During the read operand (RD) stage, the pipeline control unit 408 obtains any operand values, and/or values needed for operand address generation, for the group of decoded instructions from the register file 406.

During the address generation (AG) stage, the pipeline control unit 408 provides any values needed for operand address generation to the load/store unit 402, and the load/store unit 402 generates internal addresses of any operands located in the memory system 104 of FIG. 1. During the memory address 0 (M0) stage, the load/store unit 402 translates the internal addresses to external memory addresses used within the memory system 104 of FIG. 1.

During the memory address 1 (M1) stage, the load/store unit 402 uses the external memory addresses to obtain any operands located in the memory system 104 of FIG. 1. During the execution (EX) stage, the execution unit 404 uses the operands to perform operations specified by the one or more instructions of the group. During the write back (WB) stage, valid results (including qualified results) are stored in registers of the register file 406.

During the write back (WB) stage, valid results (including qualified results) of store instructions, used to store data in the memory system 104 of FIG. 1 as described above, are provided to the load/store unit 402. Such store instructions are typically used to copy values stored in registers of the register file 406 to memory locations of the memory system 104.

Referring to FIGS. 1, 4, 5 and 7, the conditional execution instruction 108 is typically one of several instructions (e.g., 6 instructions) fetched from the memory system 104 by the instruction unit 400 and decoded during the fetch/decode (FD) stage. During the execution (EX) stage of the conditional execution instruction 108, the register specified by the conditional execution instruction 108 (e.g., the flag register 502 or one of the general purpose registers 500) is accessed. The execution unit 404 may test the specified register for the specified condition, and provide a comparison result to the pipeline control unit 408.

As described above, if the conditional execution instruction 108 specifies the hardware flag register 502, the values of the flag bits in the hardware flag register 502 are copied to the corresponding flag bits in the static hardware flag register 504. For example, if the conditional execution instruction 108 specifies the hardware flag register 502, the pipeline control unit 408 may produce a signal that causes the values of the flag bits in the hardware flag register to be copied to the corresponding flag bits in the static hardware flag register 504.

During the execution (EX) stage of each of the instructions of the code block 110 of FIG. 1, the pipeline control unit 408 may produce a signal dependent on whether the specified condition existed in the specified register during the execution stage of the conditional execution instruction 108, and provides the signal to the execution unit 404. The execution unit 404 saves results of the instructions of the code block 110 dependent upon the signal. For example, if the specified condition existed in the specified register during the execution (EX) stage of the conditional execution instruction 108, the pipeline control unit 408 may assert the signal during the execution (EX) stage of each of the instructions of the code block 110, and the execution unit 404 may provide the results of the instructions of the code block 110 to the register file 406 only when the signal is asserted.

In the embodiment of FIG. 7, if the condition specified by the conditional execution instruction 108 of FIG. 1 is true, the results of the instructions making up the code block 110 of FIG. 1 are qualified, and the results are written to the register file 406 of FIGS. 4-5 during the corresponding write back (WB) stages. If the specified condition is not true, the results of the instructions of the code block 110 are not qualified, and are not written to the register file 406 during the corresponding execution stages (i.e., are ignored).

Figure 8A:
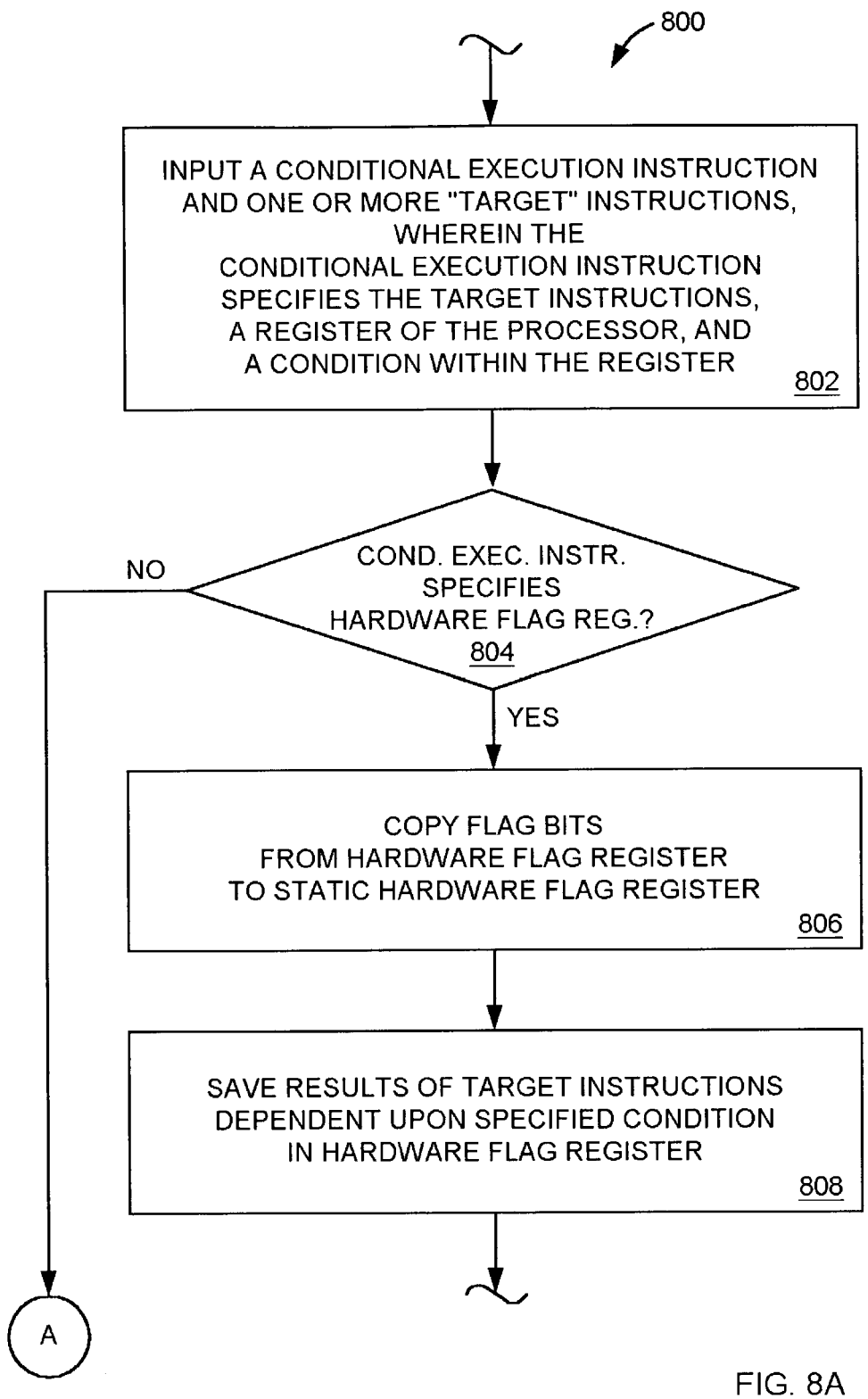
FIGS. 8A and 8B in combination form a flow chart of one embodiment of a method for conditionally executing one or more instructions.
Figure 8B:
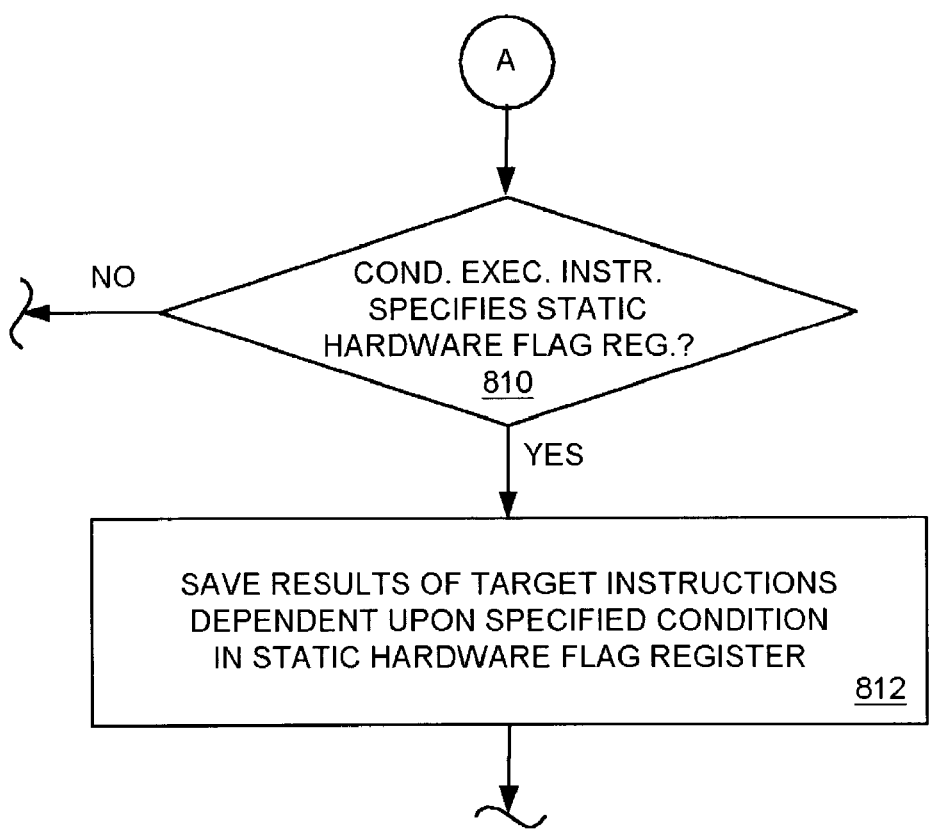

FIGS. 8A and 8B in combination form a flow chart of one embodiment of a method 800 for conditionally executing one or more instructions (e.g., instructions of the code block 110 of FIG. 1). The method 800 may be embodied within the processor 102 of FIGS. 1 and 4. During an operation 802 of the method 800, a conditional execution instruction (e.g., the conditional execution instruction 108 of FIG. 1) and the one or more instructions to be conditionally executed (i.e., "target instructions") are input (i.e., fetched or received). The conditional execution instruction specifies the one or more target instructions, a register (e.g., one of multiple flag registers or one of multiple general purpose registers), and a condition within the register (e.g., a value of a bit in a flag register or a value stored in a general purpose register).

During a decision operation 804, a determination is made as to whether the conditional execution instruction specifies a hardware flag register (i.e., a flag register that is updated during instruction execution such that flag bits in the flag register reflect a state or condition of a processor resulting from instruction execution such as the hardware flag register 502 of FIGS. 5 and 6A). In the event the conditional execution instruction specifies the hardware flag register, operations 806 and 808 are performed. On the other hand, if the conditional execution instruction does not specify the hardware flag register, a decision operation 810 is performed next.

During the operation 806, values of the flag bits in the hardware flag register are copied to corresponding flag bits in a static hardware flag register (e.g., the static flag register 504 of FIGS. 5 and 6B). The values of the flag bits existing in the hardware flag register when the conditional execution instruction is fetched or received are thus made available within the processor to subsequent instructions.

During the operation 808, a result of each of the one or more target instructions is saved dependent upon whether the specified condition exists in the hardware flag register during execution of the conditional execution instruction. For example, as described above, a conditional execution instruction that specifies the hardware flag register also specifies a flag bit within the hardware flag register, and a required value of the specified flag bit. During the operation 808, the result of each of the one or more target instructions may be saved only if the specified flag bit in the hardware flag register has the specified value during execution of the conditional execution instruction.

During the decision operation 810, a determination is made as to whether the conditional execution instruction specifies a static hardware flag register (i.e., a flag register that is updated from a hardware flag register and used to store persistent values of the flag bits of the hardware flag register, such as the static hardware flag register 504 of FIGS. 5 and 6B). In the event the conditional execution instruction specifies the static hardware flag register, an operation 812 is performed.

During the operation 812, a result of each of the one or more target instructions is saved dependent upon whether the specified condition exists in the static hardware flag register during execution of the conditional execution instruction. For example, as described above, a conditional execution instruction that specifies the static hardware flag register also specifies a flag bit within the static hardware flag register, and a required value of the specified flag bit. During the operation 812, the result of each of the one or more target instructions may be saved only if the specified flag bit in the static hardware flag register has the specified value during execution of the conditional execution instruction.

Figure 9:
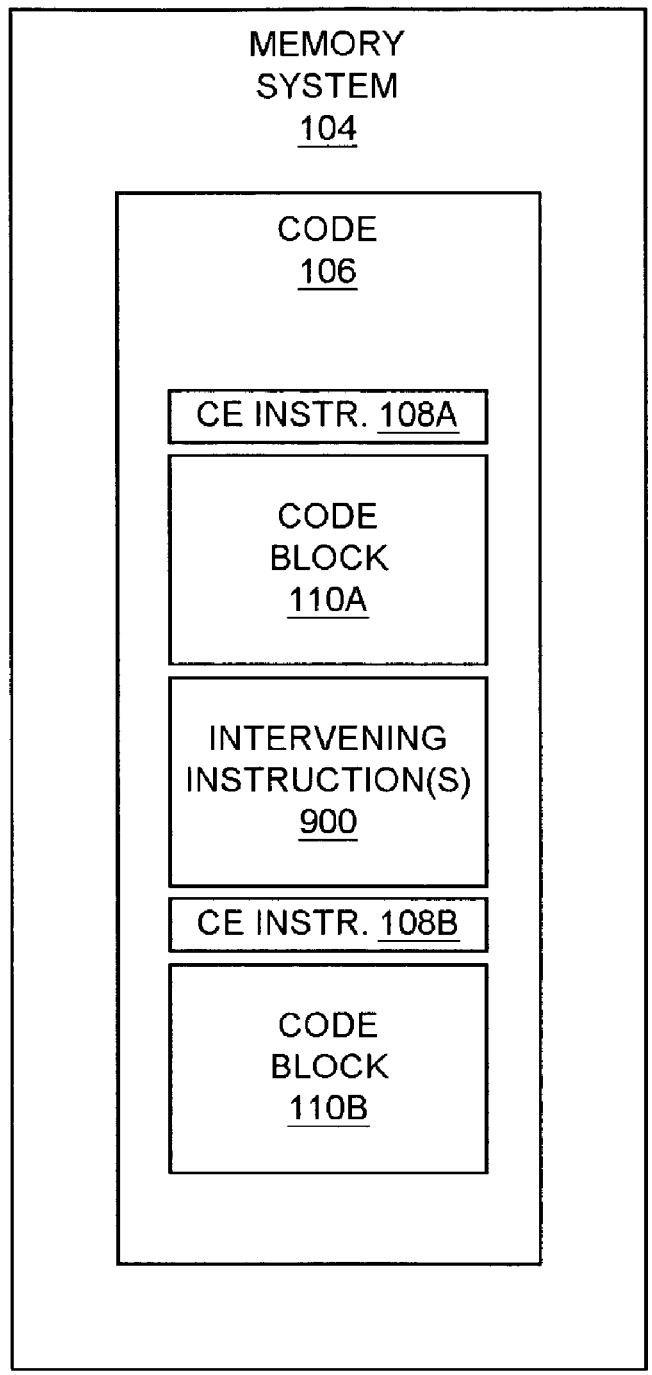
FIG. 9 is a diagram of one embodiment of the memory system of FIG. 1 wherein the code includes a first conditional execution instruction and a first code block specified by the first conditional execution instruction, a second conditional execution instruction and a second code block specified by the second conditional execution instruction, and one or more intervening instructions located between the first code block and the second conditional execution instruction.

FIG. 9 is a diagram of one embodiment of the memory system 104 of FIG. 1 wherein the code 106 includes a first conditional execution instruction 108A and a first code block 110A specified by the first conditional execution instruction 108A, a second conditional execution instruction 108B and a second code block 110B specified by the second conditional execution instruction 108B, and one or more intervening instructions 900 located between the first code block 110A and the second conditional execution instruction 108B.

The first conditional execution instruction 108A may, for example, specify the hardware flag register 502 (FIGS. 5 and 6A) of the processor 102 (FIGS. 1 and 4). In this situation, when the first conditional execution instruction 108A is input to the processor 102, values of the flag bits in the hardware flag register 502 are copied to corresponding flag bits in the static flag register 504 (FIGS. 5 and 6B). The values of the flag bits existing in the hardware flag register 502 when the conditional execution instruction 108A is fetched or received, by virtue of being stored in the static hardware flag register 504, are advantageously made available to the intervening instructions 900 and the second conditional execution instruction 108B.

For example, the second conditional execution instruction 108B may specify the static hardware flag register 504 (FIGS. 5 and 6B) of the processor 102 (FIGS. 1 and 4). In this situation, values of the flag bits of the hardware register 502 existing when the conditional execution instruction 108A was fetched or received are advantageously made available to the second conditional execution instruction 108B, and results of the instructions of the second code block 110B are saved dependent upon a condition existing in the hardware register 502 when the conditional execution instruction 108A was fetched or received.

It is noted that by virtue of automatically storing the contents of the hardware flag register 502 (FIGS. 5 and 6A) in the static hardware flag register 504 (FIGS. 5 and 6B), the values of the flag bits existing in the hardware flag register 502 when the conditional execution instruction 108A is fetched or received are advantageously made available to the second conditional execution instruction 108B without having to store the contents of the hardware flag register 502 in a general purpose register or in a memory location of the memory system 104. As a result, the intervening instructions 900 are free to use a general purpose register that may have otherwise been required to store the contents of the hardware flag register 502. Alternately, a lengthy store operation to the memory system 104 to store the contents of the hardware flag register 502, and a subsequent lengthy load operation to retrieve the stored contents of the hardware flag register 502 from the memory system 104, are avoided. In either case, the performance of the processor 102 is increased.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What we claim as our invention is:

1. A processor, comprising:
   an instruction unit configured to process a conditional execution instruction and at least one target instruction, wherein the conditional execution instruction specifies the at least one target instruction, a register, and a condition within the register;
   an execution unit operably coupled to the instruction unit and configured to execute the conditional execution instruction and unconditionally execute the at least one target instruction, but to save a result of the at least one target instruction only if the result of the at least one target instruction is qualified by the existence of the specified condition in the specified register during execution of the conditional execution instruction; and wherein in the event the conditional execution instruction specifies a first flag register, the execution unit is configured to copy a value of a plurality of flag bits in the first flag register to a corresponding second plurality of flag bits in a second flag register, and to save a result of the at least one target instruction dependent upon the specified condition in the first flag register during execution of the conditional execution instruction, wherein the first flag and second flag registers are dedicated flag registers.

2. The processor as recited in claim 1, wherein the first flag register is configured to store a first plurality of flag bits, and wherein each of the first plurality of flag bits is indicative of a different condition existing within the processor.

3. The processor as recited in claim 2, wherein the first flag register is a hardware flag register updated during instruction execution such that the first plurality of flag bits reflect a state or condition of the processor resulting from instruction execution.

4. The processor as recited in claim 2, wherein the second flag register is configured to store the second plurality of flag bits, and wherein each of the second plurality of flag bits corresponds to a flag bit in the first plurality of flag bits.

5. The processor as recited in claim 4, wherein the second flag register is a static hardware flag register updated from the first flag register and used to store copies of the first plurality of flag bits.

6. The processor as recited in claim 4, wherein in the event the conditional execution instruction specifies the first flag register and a value of one of the first plurality of flag bits in the first flag register, the execution unit is configured to copy a value of each of the first plurality of flag bits in the first flag register to the corresponding one of the second plurality of flag bits in the second flag register, and to save the result of each of the at least one target instruction dependent upon the value of the specified one of the first plurality of flag bits in the first flag register during execution of the conditional execution instruction.

7. The processor as recited in claim 1, wherein the conditional execution instruction is a fixed-length instruction.

8. The processor as recited in claim 1, wherein the at least one target instruction comprises a code block including a plurality of consecutive instructions, and wherein the conditional execution instruction specifies the code block.

9. The processor as recited in claim 8, wherein the conditional execution instruction comprises a field specifying the code block.

10. The processor as recited in claim 1, wherein the conditional execution instruction comprises a field specifying the register.

11. The processor as recited in claim 1, wherein the conditional execution instruction comprises at least one bit position specifying the condition within the register.

12. The processor as recited in claim 1, wherein the conditional execution instruction specifies a flag register or a general purpose register within the processor.

13. The processor as recited in claim 1, wherein the execution unit is configured to perform an operation specified by each of the at least one target instruction, thereby producing the result of the at least one target instruction.

14. The processor as recited in claim 1, further comprising a second conditional execution instruction specifying a second at least one target instruction, wherein in the event the second conditional execution instruction specifies the second flag register and a value of one of the second plurality of flag bits in the second flag register, the execution unit is configured to save the result of each of the second at least one target instruction dependent upon the value of the specified one of the second plurality of flag bits in the second flag register during execution of the second conditional execution instruction.

15. A system, comprising:
 a memory system and a processor coupled to the memory system;
 wherein the memory system comprises a conditional execution instruction and at least one target instruction, wherein the conditional execution instruction specifies the at least one target instruction, a register, and a condition within the register;
 wherein the processor comprises:
  a first flag register and a second flag register;
  an instruction unit configured to process the conditional execution instruction and the least one target instruction from the memory system;
  an execution unit operably coupled to the instruction unit and configured to execute the conditional execution instruction and unconditionally execute the at least one target instruction, but to save a result of the at least one target instruction only if the result of the at least one target instruction is qualified by the existence of the specified condition in the specified register during execution of the conditional execution instruction; and
  wherein in the event the conditional execution instruction specifies the first flag register, the execution unit is configured to copy the value of the flag bit to a corresponding flag bit of the second flag register, and to save a result of the at least one target instruction dependent upon the specified condition in the first flag register during execution of the conditional execution instruction, wherein the first flag and second flag registers are dedicated flag registers.

16. A method for conditionally executing at least one instruction, the method comprising:
 inputting a conditional execution instruction and an at least one target instruction, wherein the conditional execution instruction specifies the at least one target instruction, a register, and a condition within the register;
 unconditionally executing the at least one target instruction;
 performing the following in the event the conditional execution instruction specifies a first flag register:
  copying a value of a plurality of flag bits in the first flag register to a corresponding plurality of flag bits in a second flag register, wherein the first flag register and the second flag register are dedicated flag registers; and
  saving a result of the at least one target instruction only if the specified condition in the first flag register is met during execution of the conditional execution instruction.

17. The method as recited in claim 16, further comprising:
 in the event the conditional execution instruction specifies the second flag register, saving a result of the at least one target instruction dependent upon the specified condition in the second flag register during execution of the conditional execution instruction.

18. The method as recited in claim 16, wherein the at least one target instruction comprises a code block including a plurality of consecutive instructions, and wherein the conditional execution instruction specifies the code block.

19. The method as recited in claim 16, wherein the conditional execution instruction comprises a field specifying the code block.

20. The method as recited in claim 16, wherein the conditional execution instruction comprises a first field specifying the at least one target instruction, a second field specifying the register, and at least one bit position specifying the condition within the register.

21. The method as recited in claim 16, wherein the inputting comprises:

fetching a conditional execution instruction and the at least one target instruction from a memory system, wherein the conditional execution instruction specifies the at least one target instruction, a register, and a condition within the register.

22. A processor, comprising:

means for inputting a conditional execution instruction and at least one target instruction, wherein the conditional execution instruction specifies the at least one target instruction, a register, and a condition within the register;

means for unconditionally executing the at least one target instruction;

means for performing the following in the event the conditional execution instruction specifies a first flag register:

copying the value of a flag bit of the first flag register to a corresponding flag bit of a second flag register, wherein the first flag register and the second flag register are dedicated flag registers; and saving a result of the at least one target instruction only if the result is qualified by the specified condition in the first flag register during execution of the conditional execution instruction.

23. The processor as recited in claim 22, further comprising means for saving, in the event the conditional execution instruction specifies the second flag register, a result of the at least one target instruction dependent upon the specified condition in the second flag register during execution of the conditional execution instruction.

24. The processor as recited in claim 1, wherein the conditional execution instruction and the instruction block reside in sequential addresses of a program memory.

25. The method as recited in claim 16, wherein the instruction block immediately follows the conditional execution instruction in a program memory.

* * * * *